United States Patent

[11] 3,594,500

[72] Inventors James L. James
Woodbine;
Hiliary H. Nall, Beltsville, both of, Md.

[21] Appl. No. 144,511
[22] Filed Oct. 11, 1961
[45] Patented July 20, 1971
[73] Assignee The United States of America as represented by the Secretary of the Navy

[54] MISSILE COMMUNICATIONS LINK
11 Claims, 5 Drawing Figs.

[52] U.S. Cl. .......... 178/22, 179/15, 329/106, 340/147
[51] Int. Cl. .......... H04l 9/00
[50] Field of Search .......... 178/23.1, 22; 340/147 A; 179/15 AP; 329/104, 106

[56] References Cited
UNITED STATES PATENTS
2,933,364 4/1960 Campbell .......... 179/15 APC
2,946,044 7/1960 Bolgiano, Jr. et al. .......... 179/15 APC

*Primary Examiner*—Rodney D. Bennett, Jr.
*Assistant Examiner*—Brian L. Ribando
*Attorneys*—R. S. Sciascia and J. A. Cooke

ABSTRACT: The system provides for the simultaneous control of a plurality of missiles and comprises a missile receiver system for handling a large quantity of data. The receiver performs a parity check for handling an error detecting code, is able to handle phase-coded digital transmission, and contains means for distinguishing between different data signals.

JAMES L. JAMES
HILARY H. NALL
INVENTORS

BY W. O. Quesenberry
Claude Funkhouser

ATTORNEYS

J. L. JAMES
H. H. NALL
INVENTORS

BY W. O. Duesenberry
Claude Funkhouser
ATTORNEYS

JAMES L. JAMES
HILARY H. NALL
INVENTORS

BY W. O. Quesenberry
Claude Funkhouser
ATTORNEYS

MISSILE COMMUNICATIONS LINK

The present invention relates in general to radar systems and in particular to a digital data-handling system for a radar-to-missile link.

The weapon system of which the present invention is a component part differs from conventional weapon systems because of its multiple target handling ability and its high resistance to electronic countermeasures. Such requirements necessarily demand the use of large quantities of data to provide proper control and accuracy of performance. The simultaneous control of a plurality of missiles multiplies the guidance problems and the chances for error found in the conventional system.

The invention proposes a novel code and a data-handling missile receiver for receiving said code. The receiver is designed to handle large amounts of multiplexed data and contains circuitry for performing a parity check.

It is an object of the present invention to provide a digital code for controlling the operation of a plurality of missiles.

It is a further object of the invention to provide a missile receiver system for handling a large quantity of complex data.

It is another object of the invention to provide a digital receiver containing a parity check system for handling an error detecting code.

It is a further object of the invention to provide a digital receiver for a missile guidance system which contains a means for distinguishing between different data signals.

Still another object of the invention is to provide a digital receiver for handling phase-coded digital transmissions.

Other objects and many of the attendant benefits of this invention will be readily appreciated as the same becomes better understood by reference to the following detailed description when considered in connection with the accompanying drawings, in which.

In the surface-to-air missile system of which the invention is a component part each missile is to be guided from the ground during midcourse flight to the target and then is to guide itself with its own homing equipment after coming within a predetermined range of the target.

During midcourse flight complete guidance instruction is to be provided the missile. The microwave transmission to the missile during a data period consists of a pulse divided into 16 phase-coded segments from which a 15-bit code is derived. The first segment gives the reference phase with respect to which the second segment phase is 0° or 180° depending on whether the first bit is a 0 or 1. Each succeeding segment is phased with respect to the preceding segment to provide the subsequent bits of the code.

Figure 1:
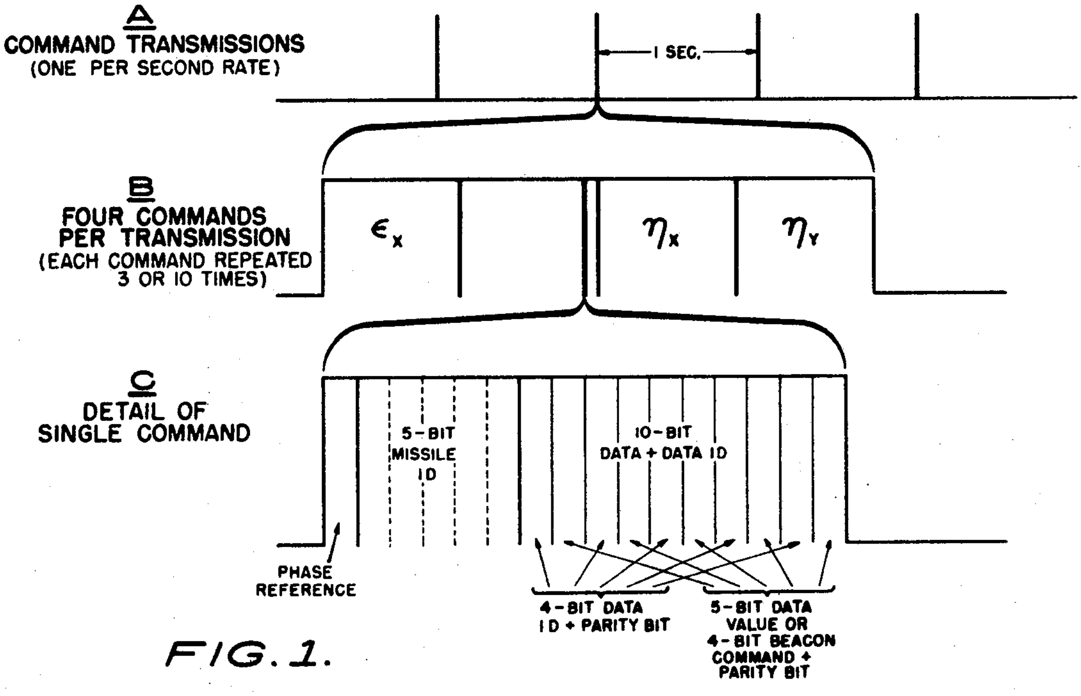
FIG. 1 is a schematic representation of the code which forms part of the invention.

The midcourse radar-to-missile link sequence is given in FIG. 1. The link comprises command transmissions at a one per second rate as shown in line A. Each transmission shown in line B is made up of four commands which are repeated three or ten times depending upon the information contained therein. Line C shows the detail code of a single command according to the invention. Since the system contemplates the simultaneous control of a plurality of missiles, a prime requirement of any transmission is that it contain a recognition code to avoid the possibility of reception by a missile of a transmission intended for another missile. For this reason the first five bits of the 15-bit code comprises missile recognition data. If the transmission received by the missile does not contain the proper recognition code, the receiver in the missile will not accept the data in this transmission.

The remaining bits of the code are composed of a five bit data identification code and a five bit data value code. One of the bits provided is a parity bit for maintaining a constant parity check within the system. The parity code system is a redundant code check wherein a single binary digit is added to a coded character such that the number of ones in each character is either always even or always odd. Proper circuitry can then reject every character not having an acceptable combination.

Parity check systems have been known heretofore. However, errors in the differentially coherent system under consideration tend to occur in pairs. This is so because a given segment of the code serves as the signal for one bit as well as the reference for the following bit. Because of this characteristic, the single error detecting method is unsatisfactory.

In order to avoid this problem the invention proposes the interleaving of the bits for the data value and the data identification codes and the provision of a parity bit for the data identification code only. Thus, when the paired errors occur, only one will be in the data identification code which makes the parity check effective.

Figure 2A:
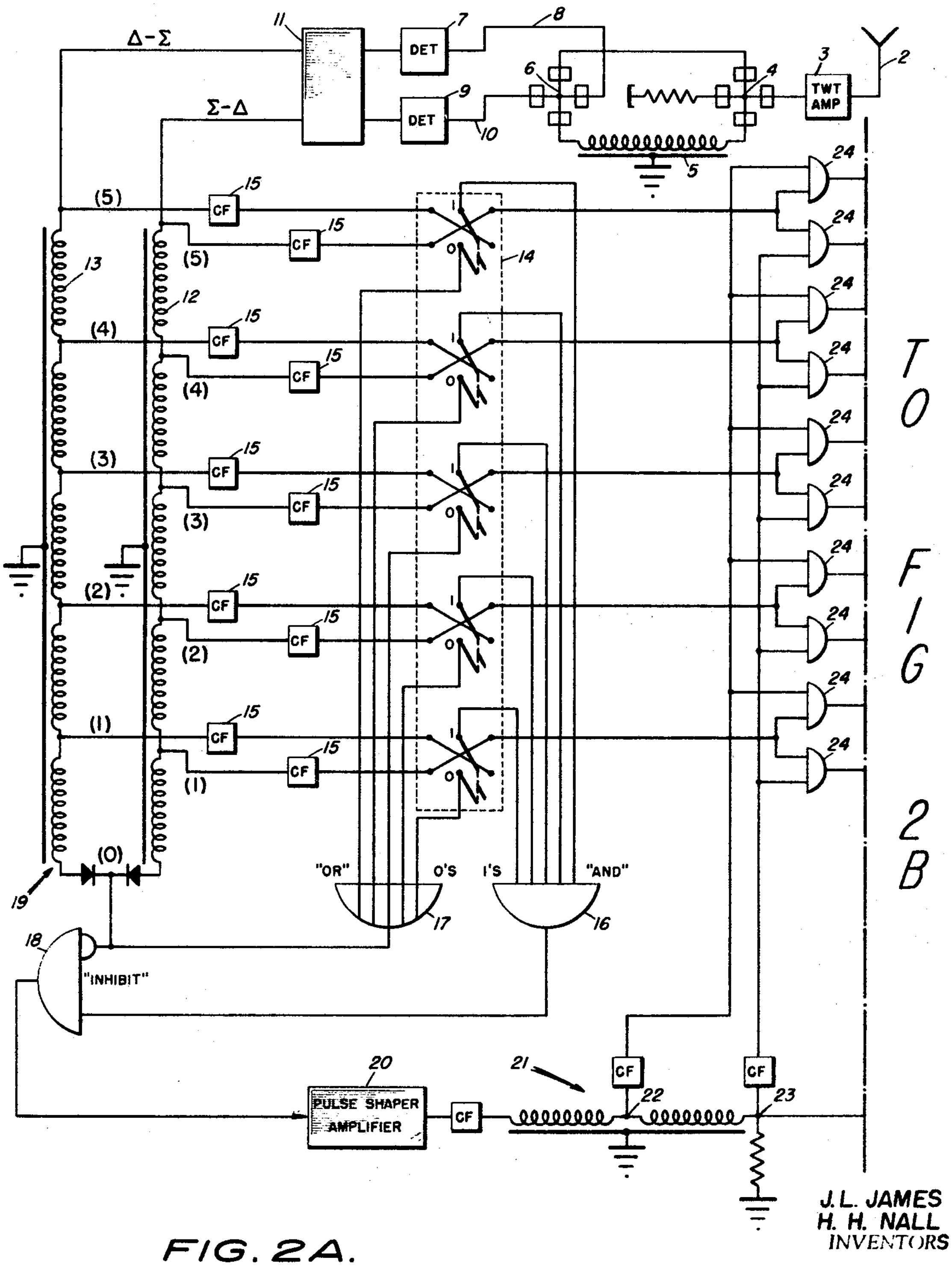
FIG. 2A is a schematic diagram of a portion of the receiver system which forms another part of the invention.
Figure 2B:
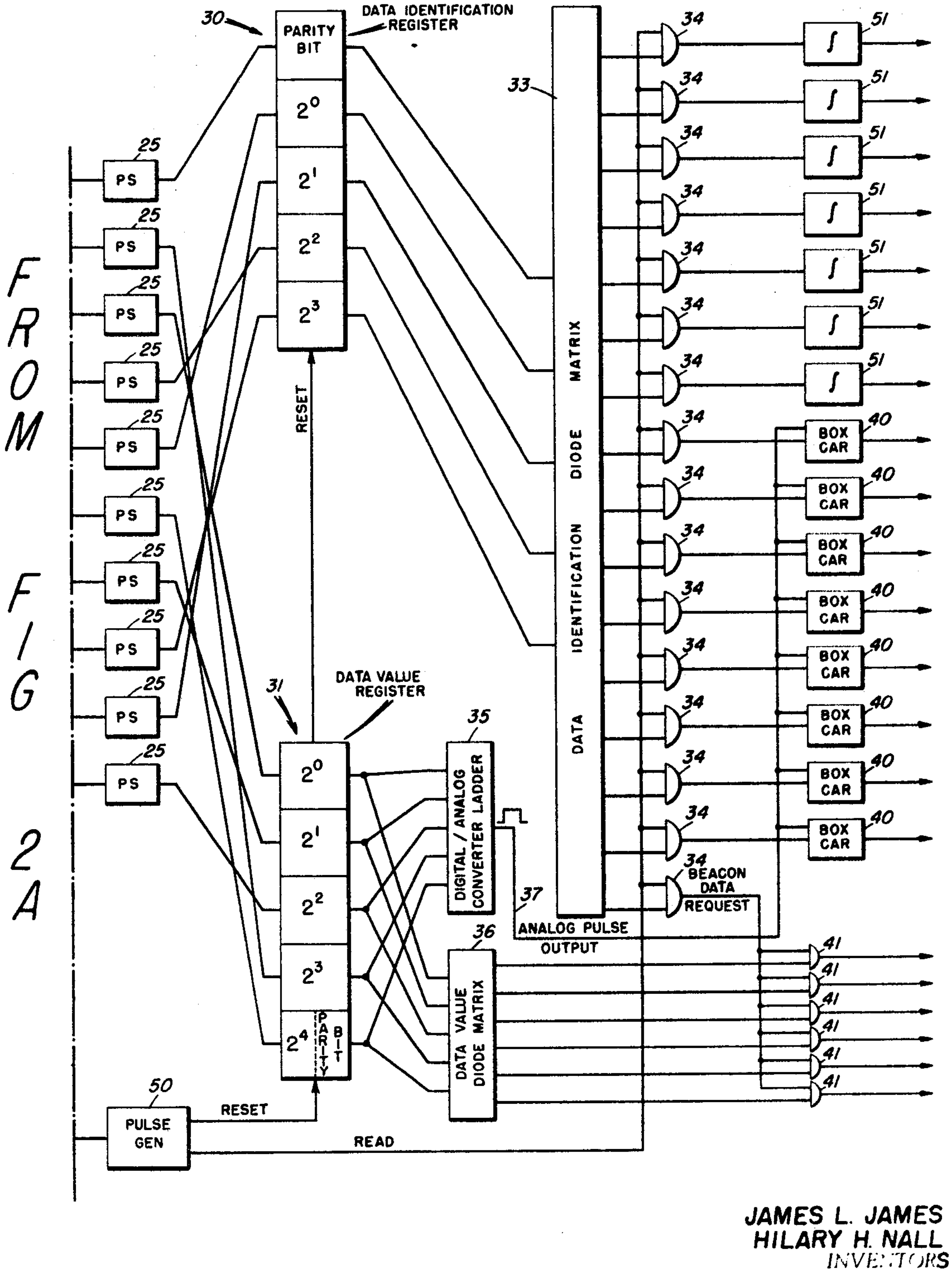
FIG. 2B is a schematic diagram of the remainder of the receiver system illustrated in FIG. 2A.

A block diagram of the receiver which forms part of the invention is shown in two parts as FIG. 2A and 2B. The microwave phase-coded pulse is received at antenna 2 and amplified in traveling wave tube 3. The output of the traveling wave tube 3 is connected to a "magic tee" 4 which has one of its channels loaded so that the microwave pulse is split into two equal channels. One channel is applied directly to one input of a second "magic tee" 6 and the other channel is applied to the other input of "magic tee" 6 through a delay line 5. The delay line 5 is designed to delay the second channel by one bit with respect to the first channel so that when the signals are recombined complementary amplitude-modulated pulse codes will result from additions and subtractions of adjacent phase-coded segments.

The recombination of the two channels is performed in "-magic tee" 6 which applies a "difference" pulse to detector 7 via line 8 and a "sum" pulse to detector 9 via line 10. The outputs of detectors 7 and 9 are applied to a paraphase differential amplifier 11 where the quadrature components of each signal are eliminated, thereby materially reducing the noise in the signal. The outputs of the amplifier 11 representing the inphase and out-of-phase components only are applied to a pair of five-tap input delay lines 12 and 13, respectively.

The five taps (1) to (5) on each of the delay lines 12 and 13 are connected to individual double pole double throw switches 14 through a ceramic triode cathode follower 15. One pole of each switch 14 is connected to an "and" gate 16 and the other pole is connected to an OR-gate 17. The OR-gate 17 is connected to receive all of the 0's in the recognition code and the AND gate 16 is connected to receive all of the 1's in the recognition code.

The recognition code switches 14 are set up prior to launch by connecting the five inputs of the AND gate 16 to the delay line cathode follower outputs where 1's are expected according to the recognition code for the missile involved. The OR-gate inputs are then automatically connect to the 03 s by the switch 14 itself. The outputs of the AND-gate 16 and the OR-gate 17 are applied to an INHIBIT-gate 18 in such a way that if a signal appears in the output of the OR-gate 17 the signal from the AND-gate 16 will be prevented from passing through the INHIBIT-gate 18. Thus only when the correct code is received will the AND-gate inputs be all 1's and the OR-gate inputs all 0's permitting the AND-gate output to pass through the INHIBIT-gate 18.

The input delay lines 12 and 13 also contain a section 19 called a "look-ahead" circuit. The proper recognition code for any given missile not only must be a particular series of five bits but must also be the first five bits of the transmission. If the transmission intended for another missile should contain the same five bits as required by the recognition code, these bits will be located in some other position in the transmission than the first five bits, but this arrangement may still trigger the receiver in the missile causing it to be guided by false information. To prevent this situation the "look-ahead" circuit 19 has been added to the recognition circuitry. This circuit inhibits reception if the recognition code received is preceded by other data, i.e., if the data received is not the first five bits of the code.

Ordinarily whenever the proper five bits are lined up in terminals (1) to (5) of the delay lines 12 and 13 the AND-gate 16 will pass a pulse through INHIBIT-gate 18 to trigger the receiver. However, if these five bits are not the first five bits of a transmission, they will be preceded by a bit which will locate itself at the (0) terminals. As long as a bit resides in the "look-ahead" section 19 INHIBIT-gate 18 will be activated and no signal will be permitted to pass through the gate. Thus, this section 19 looks ahead of the five bits which are attempting to trigger the receiver to determined if they are the first five bits of the transmission. If they are not, operation of the receiver is inhibited.

The output of INHIBIT-gate 18 is applied to a pulse shaper-amplifier 20 which in turn drives a timing delay line 21 having two taps 22 and 23. The output of tap 22 is timed to coincide with the arrival of the second group of five bits of the code in the "sum" delay line 12, and the second tap 23 is timed with the last group of five bits of the code. The delay line outputs from taps 22 and 23 drive fast-recovery diode AND-gates 24 which introduce the parallel millimicrosecond pulse codes from the input delay lines into pulse-stretching amplifiers 25, which stretch the pulses to lengths more suitable for manipulation in succeeding transistor circuits. The stretched pulses are then routed to the proper flip-flops of the data identification register 30 and the data value register 31 which retain the parallel code until reset. The connections between the pulse stretching amplifiers 25 and the registers 30 and 31 are interleaved so as to compensate for the original interleaving of bits and separate the identification code and the data value code.

Figures 3, 4:
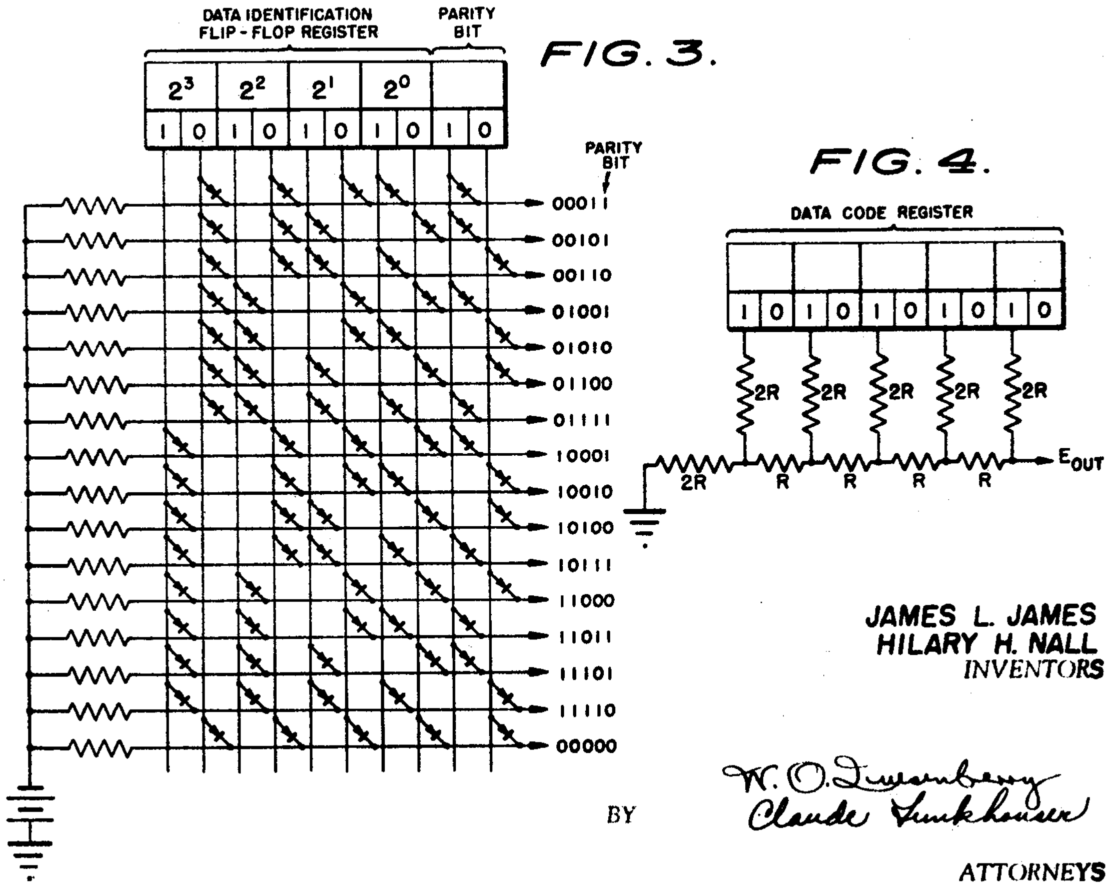
FIG. 3 is a detailed schematic of the data identification diode matrix which is part of the receiving system shown in FIG. 2B.
FIG. 4 is a schematic of the digital-analog converter ladder which is part of the receiving system shown in FIG. 2B.

The data identification register 30 drives a data identification diode matrix 33 which is shown in elementary form in FIG. 3. The matrix 33 operates on a 4-bit plus a parity bit code. The parity bit is introduced into the switching circuit so as to require that the sum of the 1's in the data identification code be even before an output can be produced. The outputs of the diode matrix 33 are each connected to an AND-gate 34 which prevents passage of information to the receiver output until a "read" pulse is received.

The output of the data value register 31 is applied on the one hand to a digital-analog converter ladder 35 and on the other hand to a data value diode matrix 36. The digital-analog converter ladder 35, shown in greater detail in FIG. 4, produces an analog pulse output which is applied via line 37 to a series of boxcars 40 in the receiver output. Requests for beacon data are handled by data value diode matrix 36. The output of this matrix 36 is connected to a series of AND-gates 41 which are by the data identification matrix 33 via a gate 34.

The "read" pulse which activates gates 34 is derived from a pulse generator 50 which emits a pulse in response to a trigger from timing delay line 21. The "read" pulse developed by the pulse generator 50 gates the analog voltage from the digital-analog converter ladder 35 into the proper boxcar 40, or gates the output of matrix 33 to one of a series of integrators 51.

The operation of the circuit is as follows. A microwave phase-coded pulse containing a plurality of information is received at antenna 2, amplified by traveling wave tube 3 and split into two channels by "magic tee" 4. One of these channels is delayed by delay line 5 and then both channels of the signal are applied to a second "magic tee" 6 where "sum" and "difference" signals are produced. These signals are detected and then applied to paraphase differential amplifier 11 which passes only the inphase and out-of-phase- components of the signals thereby eliminating the quadrature noise from the system.

The two signals from paraphase amplifier 11 are then applied to the input delay lines 12 and 13. If the first five bits of the transmission have 1's and 0's placed such that in passing through the previously set recognition code switch 14 all of the 1's are applied to AND-gate 16 and all of the 0's are applied to OR-gate 17, a pulse will issue from gate 16 and will pass through INHIBIT-gate 18 to trigger the receiver. If the 1's and 0's appear at the wrong gates or if the proper recognition bits are not part of the first five bits of the transmission, no pulse will pass through the INHIBIT-gate 18.

The pulse which passes through INHIBIT-gate 18 may properly be called a "recognition" and a "timing" pulse since it performs both of these functions. This pulse is applied to two-terminal timing delay line 21. As this pulse proceeds down delay line 21 the second five bits of the code are proceeding down the input delay lines 12 and 13. When the five bits in delay line 12 are in the proper position to be applied the registers 30 and 31, the pulse in timing delay line 21 reaches terminal 22 and activates appropriate gates 24 permitting passage of the second five bits which comprise both data value and data identification bits.

The pulse then continues down delay line 21 and arrives at terminal 23 at the same time that the last five bits of the code are in the proper position in delay line 12 to be applied to the registers 30 and 31. The remaining gates 24 are activated at this time allowing these five bits which comprise the remaining data value and data identification bits to pass. The "timing" pulse is then withdrawn from timing delay line 21 and is used to trigger pulse generator 50.

When the entire transmission has been received all of the flip-flops in the data identification register 30 and the data value register 31 will be set. The data identification register 30 drives a diode matrix 33 which identifies the data and applies it via a gate 34 to an integrator 51 or a boxcar 40 in the output of the receiver. The gates 34 are activated by a "read" pulse from pulse generator 50. The outputs from the matrix 33 which contain the integrators 51 are designed to handle the critical commands required by the system. To cut down all chance of error these commands are repeated several times during a given period and then integrated and passed through a threshold detector. Thus the chance of accidental activation of this equipment is greatly reduced.

The data value register 31 drives a digital-analog converter 35 which applies an analog pulse to the boxcars 40. The diode matrix 33 selects which output channel is to receive this pulse. In the event that the only information in the code is a request for beacon data, the diode matrix 33 will select the last gate 34 to be activated. This gate will in turn activate gates 41 permitting whatever data that appears in the data value matrix 36 to pass out of the receiver.

The receiver which forms part of the invention is able to handle sixteen different kinds of data and is able to distinguish between them. In addition the invention contains novel circuitry which prevents the receiver from receiving data intended for another receiver. Of course the system could be adapted to handle an increased amount of data by merely increasing the size of the registers, matrices, and delay lines. These and other modifications and variations of the present invention are possible in the light of the above teachings. It is therefore to be understood that within the scope of the appended claims the invention may be practiced otherwise than as specifically described.

What we claim is:

1. A system for receiving phase coded transmissions, comprising a receiving antenna, a pair of input delay lines, means including a differential amplifier for applying the input signal from said antenna to said input delay lines, gating means connected to said input delay lines for passing the signal from said lines only when a particular transmission is received by said system, a pair of registers connected to said input delay lines and said gating means, and a diode matrix driven by one of said registers for selecting the proper output of the system into which to channel the information stored in the other of said registers.

2. A system as set forth in claim 1, wherein the connections between said gating means and said registers are randomly arranged so that the bits in the code will be interleaved in said registers thereby increasing the effectiveness of a parity check of the code.

3. A system as set forth in claim 2, further comprising a digital-analog converter ladder connected to said other register for converting digital information stored in said other register to its analog equivalent before being switched to the output of the system.

4. In a system for receiving phase coded transmissions, an antenna for receiving a phase coded signal, a pair of input delay lines containing a plurality of taps, means including a difference amplifier for converting said signal into a pair of complementary pulse codes and for applying said pulse codes to said input delay lines, a pair of registers, a plurality of first AND-gates connecting one of said input delay lines to said pair of registers, an OR-gate and a second AND-gate, a plurality of switches connecting the taps on said delay lines to said OR-gate and said second AND-gate according to a prearranged pattern, an INHIBIT-gate, said OR-gate and said second AND-gate being connected to said INHIBIT-gate such that a signal will pass from said second AND-gate through said INHIBIT-gate as long as no signal is derived from said OR-gate, a timing delay line for receiving a pulse from said INHIBIT-gate, said timing delay line operating to trigger said first AND-gates so as to pass said pulse codes to said registers in predetermined groups.

5. In a system as set forth in claim 4, wherein one end of said pair of input delay lines is connected to said INHIBIT-gate so as to prevent operation of said gate so long as coded information is present in said one end of said pair of input delay lines.

6. A system for receiving phase coded transmissions, comprising an antenna for receiving a phase coded signal, waveguide means for converting said signal into a pair of complementary amplitude-modulated pulse codes, a first gating means for identifying said coded transmission, switch means for applying a portion of said transmission to said first gating means, means including a pair of delay lines for transferring bits of said code from said waveguide to said switch means in predetermined groups, a second gating means for passing a signal from said first gating means to a timing delay line only when a particular transmission is received by said system, a plurality of fourth gating means connected to said switching means for passing the input pulses from one of said pair of delay lines only in response to a trigger pulse from said timing delay line, a pair of registers for receiving and storing data from said fourth gating means, and a diode matrix driven by one of said registers for selecting the proper output of the system into which to channel the information stored in the other of said registers in response to a trigger from said timing delay line.

7. A system as set forth in claim 6, wherein the connections between said fourth gating means and said registers are randomly arranged so that the code bits will be interleaved in said registers, thereby increasing the effectiveness of a parity check of the code received.

8. A system for receiving phase coded transmissions, comprising an antenna for receiving a phase coded digital signal, a pair of input delay lines, means including a differential amplifier for applying the input signal from said antenna to said input delay lines, gating means connected to said delay lines for passing only certain select transmissions, a pair of registers connected to said delay lines via said gating means, a first diode matrix driven by one of said registers for selecting the proper output of the system into which to channel the information stored in the other of said registers, and a second diode matrix connected to said other register for activating additional outputs when pulsed by said first diode matrix.

9. A system as set forth in claim 8, wherein the connections between said gating means and said registers are randomly arranged so that the bits in the code will be interleaved in said registers thereby increasing the effectiveness of a parity check of the code.

10. A system as set forth in claim 9, further comprising a digital-analog converter ladder connected to said other register for converting the digital information stored in said other register to its analog equivalent prior to its being switched to the output of said system.

11. A system as set forth in claim 8, wherein said gating means comprises a plurality of first AND-gates connecting one of said input delay lines to said pair of registers, an OR-gate and a second AND-gate, a plurality of switches connecting said delay lines to said OR-gate and said second AND-gate according to a prearranged pattern, an INHIBIT-gate, said OR-gate and said second AND-gate being connected to said INHIBIT-gate, and a timing delay line connected to said INHIBIT-gate for controlling the operation of said first AND-gates.